US008823447B2

(12) United States Patent
Gelman

(10) Patent No.: US 8,823,447 B2
(45) Date of Patent: Sep. 2, 2014

(54) TIME-BASED APPARATUS AND METHOD TO MITIGATE SEMICONDUCTOR AGING EFFECTS

(75) Inventor: Anatoly Gelman, San Diego, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

(21) Appl. No.: 13/331,765

(22) Filed: Dec. 20, 2011

(65) Prior Publication Data

US 2013/0043914 A1 Feb. 21, 2013

Related U.S. Application Data

(60) Provisional application No. 61/524,538, filed on Aug. 17, 2011.

(51) Int. Cl.
*G05F 1/10* (2006.01)

(52) U.S. Cl.
USPC ............ 327/544; 327/530; 324/532; 324/535

(58) Field of Classification Search
USPC ............. 327/544, 530, 545; 324/537, 762.01, 324/762.09, 532, 535
See application file for complete search history.

(56) References Cited

U.S. PATENT DOCUMENTS

| 2006/0049886 A1* | 3/2006 | Agostinelli et al. ........... 331/175 |
| 2007/0132523 A1* | 6/2007 | Newman ........................ 331/175 |
| 2009/0116578 A1* | 5/2009 | Sperlich et al. ............... 375/285 |
| 2010/0194400 A1* | 8/2010 | Baumann et al. ............. 324/537 |
| 2011/0181315 A1* | 7/2011 | Krishnan .................. 324/762.01 |
| 2011/0215827 A1* | 9/2011 | Mohammad et al. .... 324/762.09 |
| 2013/0283069 A1* | 10/2013 | Matsuda ....................... 713/300 |

* cited by examiner

*Primary Examiner* — Lincoln Donovan
*Assistant Examiner* — Jung H Kim
(74) *Attorney, Agent, or Firm* — Sterne, Kessler, Goldstein & Fox P.L.L.C.

(57) ABSTRACT

Systems, methods, and computer readable media that can mitigate the effects of semiconductor aging in a semiconductor device are described. Traditional methods of mitigating semiconductor aging can be wasteful since they overcorrect for aging using a high operational voltage. The approach discussed herein steps up the operational voltage for the electronic device with time based on predetermined aging models. This allows power consumption by the electronic device, particularly early in the designed operational life, to be much less than it would otherwise be.

23 Claims, 7 Drawing Sheets

US 8,823,447 B2

TIME-BASED APPARATUS AND METHOD TO MITIGATE SEMICONDUCTOR AGING EFFECTS

CROSS REFERENCE TO RELATED APPLICATIONS

This patent application claims the benefit of U.S. Provisional Patent Application No. 61/524,538, filed Aug. 17, 2011, entitled "Power Management Unit," which is incorporated herein by reference in its entirety

BACKGROUND

1. Field of the Invention

The invention relates to systems and methods of mitigating the effect of aging in electronic semiconductor devices based on the operational age of the device.

2. Related Art

BACKGROUND

The performance of semiconductor devices used in electronic circuits often degrades over time due to the effects of hot carrier injection, bias temperature instability, oxide breakdown, etc. This performance degradation is generally referred to as "semiconductor aging," or simply "aging." In processor cores, semiconductor aging is manifested as a reduction in processor speed over time, for a given supply voltage. One way to combat some of the effects of aging is to increase the operating voltage of the semiconductor device over its minimum operating voltage ($V_o$) by a voltage margin. However, the voltage margin required to offset the effects of aging semiconductor material increases with the age of the semiconductor device.

Thus, there is need in the art for electronic devices that address the problems caused by aging semiconductor materials, but that is also sensitive to power consumption.

BRIEF SUMMARY

Embodiments of the disclosure include systems, methods, and computer readable media that mitigate the effects of aging semiconductor material in an electronic device. According to the method, a first operation voltage for the electronic device is initialized to a predetermined initial voltage level. The elapsed time since an initial time can then be determined. Based on the elapsed time, a first appropriate operating voltage level can then be determined and the operating voltage can be set to the first appropriate operating voltage. In additional embodiments, a second operating voltage can be initialized to a second predetermined initial voltage level. Furthermore, a second appropriate operating voltage can be determined based on the elapsed time and the second operating voltage set to the second appropriate operating voltage. The first operating voltage can be used to power a first portion of the electronic device and the second operating voltage can be used to power a second portion of the electronic device.

According to embodiments, an electronic device is provided. The electronic device includes a power supply, an operational component, and control circuitry. The power supply can be configured to produce a first operating voltage at a plurality of different levels. The operational component is configured to be powered, at least in part, by the first operating voltage. The control circuitry is configured to initialize the first operating voltage to a predetermined initial voltage level, determine an elapsed time since an initial time, determine a first appropriate operating voltage based on the determined elapsed time, and to set the first operating voltage to the first appropriate operating voltage. In additional embodiments, the power supply is also configured to produce a second operating voltage at a plurality of different levels. Furthermore, the operational component can comprise a first portion and a second portion where the first portion is configured to be powered by the first operating voltage and where the second portion is configured to be powered by the second operating voltage. Some embodiments of the disclosure also have the control circuitry configured to initialize the second operating voltage to a predetermined voltage level, determine a second appropriate operating voltage based on the determined elapsed time, and set a second operating voltage to the second appropriate operating voltage.

According to embodiments, a computer readable medium is provided. The computer readable medium includes instructions that, when executed by a computer, cause the computer to initialize a first operating voltage for an electronic device to a predetermined initial voltage level. The instructions cause the computer to determine an elapsed time since an initial time and to determine a first appropriate operating voltage based on the determined elapsed time, and set the first operating voltage to the first appropriate operating voltage. According to some embodiments, the computer readable medium can contain instructions that cause the computer to initialize a second operating voltage to a second predetermined initial voltage level, determine a second appropriate operating voltage based on the determined elapsed time, and set a second operating voltage to the second appropriate operating voltage. The first and second operating voltages can be used to power first and second portions of an electronic device.

BRIEF DESCRIPTION OF THE DRAWINGS/FIGURES

Embodiments of the disclosure are described with reference to the accompanying drawings. In the drawings, like reference number indicate identical or functionally similar items. Additionally, the left-most digit(s) of a reference number indicates the drawing in which the reference number first appears.

DETAILED DESCRIPTION

Figure 1:
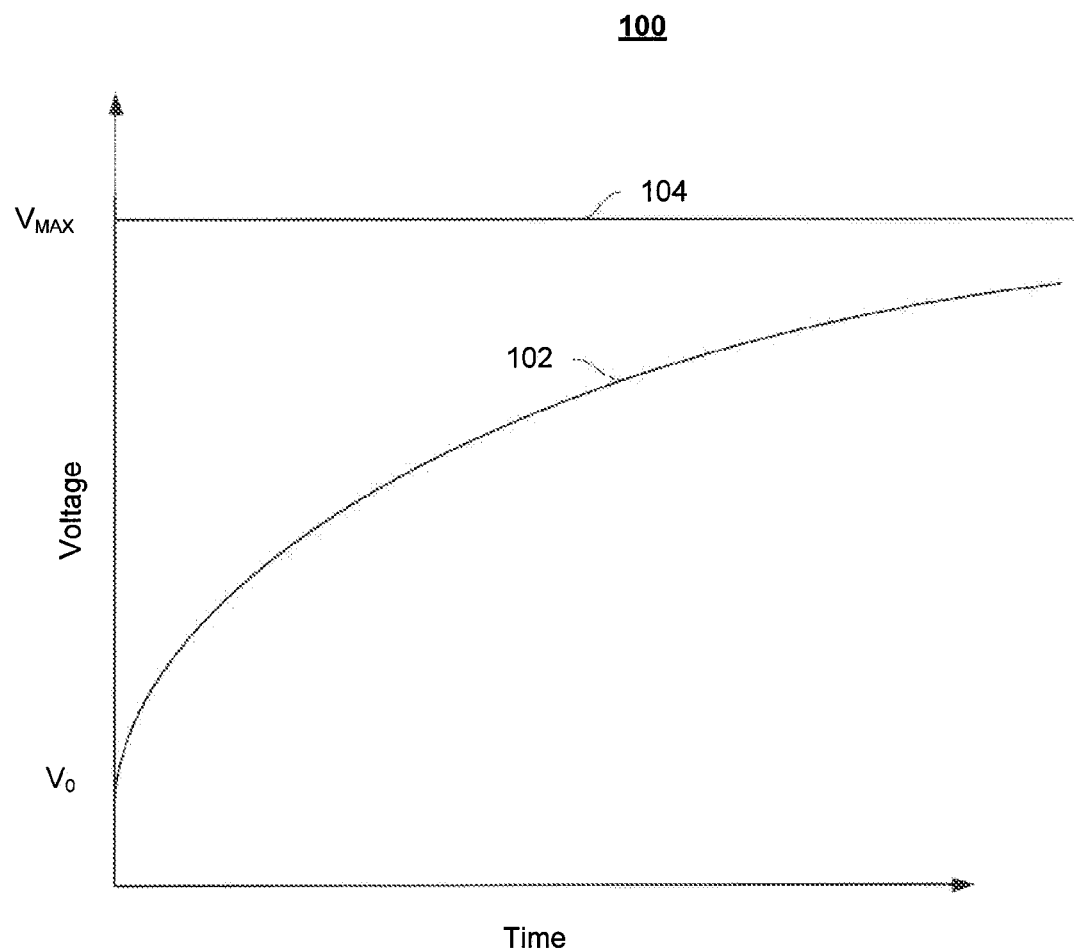
FIG. 1 illustrates the required voltage margin to compensate for semiconductor aging over time.

The following detailed description refers to accompanying drawings to illustrate exemplary embodiments consistent with the disclosure. References in the detailed description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art to affect such a feature, structure, or characteristic in connection with other exemplary embodiments whether or not explicitly described.

The exemplary embodiments described herein are provided for illustrative purposes, and are not limiting. Other exemplary embodiments are possible and modifications may be made to the exemplary embodiments within the spirit and scope of the disclosure. Therefore, the detailed description is not meant to limit the disclosure. Rather, the scope of the invention is defined only in accordance with the following claims and their equivalents.

Embodiments of the disclosure may be implemented in hardware, firmware, software, or any combination thereof. Embodiments of the disclosure may also be implemented as instructions stored on a computer-readable medium which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, and instructions may be described herein as performing certain actions. However, it should be appreciated that such descriptions are merely for convenience and that such actions in fact result from competing devices, processors, controllers or other devices executing the firmware, software, routines, instructions, etc.

The following detailed description of the exemplary embodiments will so fully reveal the general nature of the disclosure that others can, by applying knowledge of those skilled in the relevant arts readily modify and/or adapt for various applications such exemplary embodiments, without undue experimentation, without departing from h spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in the relevant arts in light of the teachings herein.

FIG. 1 illustrates the operating voltage that an electronic device requires to operate over time in order to compensate for the effects of aging semiconductor material. As can be seen, the required operation voltage $V_R$ (shown as curve 102) begins at a minimum voltage $V_0$. As the device ages, however, additional voltage is required to compensate for the aging semiconductor material in the electronic device, and approaches a maximum voltage ($V_{MAX}$) at the end of the operational life of the device. For instance, if the device is designed to have an operational life of 10 years, then $V_R$ would be $V_{MAX}$ after 10 years of operation. This voltage is represented by curve 104 in FIG. 1.

One method to combat semiconductor aging is to overcorrect (at least initially) by setting the operational voltage ($V_{OP}$) for devices to the maximum voltage ($V_{MAXx}$), even at the beginning of use. The problem with this method is that there is a significant period of time during the operational life of an electronic device when the operational voltage of the device is set to be much higher than required to combat the effects of the aging semiconductor. This results in increased power consumption compared to what is necessary to run the electronic device, which can result in reduced battery life, increased cost of operation, and consumer dissatisfaction.

Figure 2:
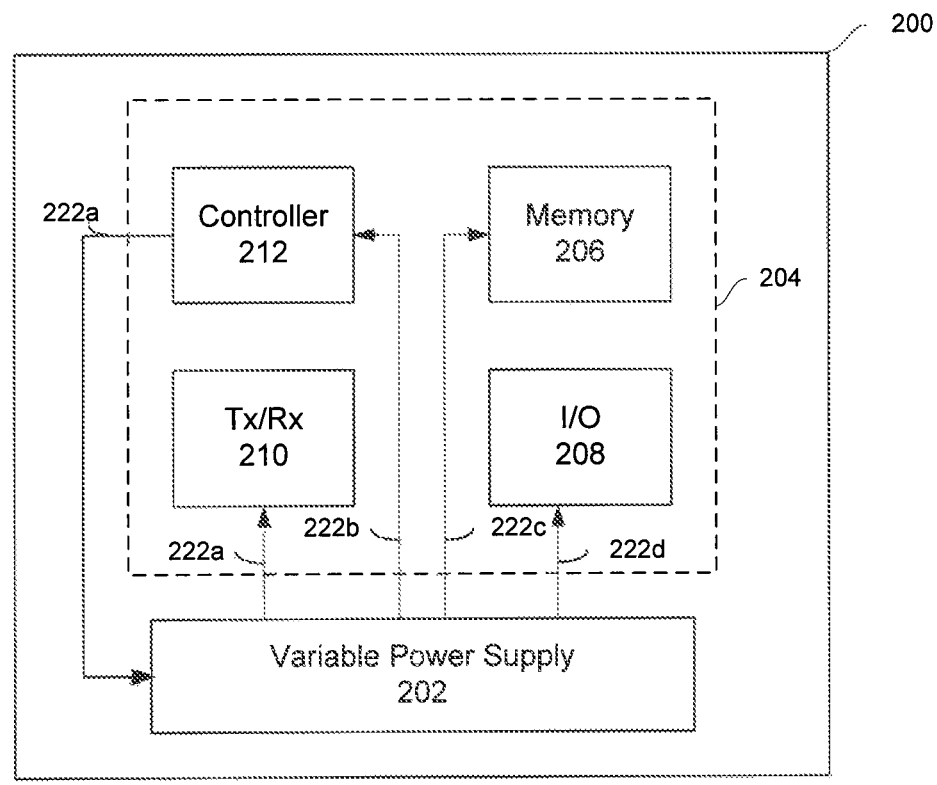
FIG. 2 illustrates an electronic semiconductor device according to embodiments of the disclosure.

FIG. 2 is a functional block diagram of an electronic semiconductor device 200 according to embodiments of the present disclosure. The semiconductor device 200 includes a variable power supply 202 and an operational component 204. The operational component 204 can comprise a number of different components used for performing the functions the device is intended to perform. Furthermore, the operational component 204 can be manufactured as a single semiconducting element (i.e., a system on chip or ASIC) or be comprised of a number of separate semiconductor devices. Herein, semiconductor devices are devices that are produced, at least in part, out of a semiconductor material, such as silicon, gallium arsenide (GaAs), germanium, etc, and have electronic functionality, as will be understood by those skilled in the art. It should be noted, however, that embodiments of the invention can cover the end-to-end aging of the whole product and not just the semiconducting components. For instance, embodiments of the invention could be used to cover the aging of the voltage regulator, the aging of printed circuit board interconnects, the aging of decoupling capacitors on the voltage supply, and the aging of other electronic and/or semiconductor components as will be understood by those skilled in the arts.

The operational component 204 may include a controller 212, a memory 206, and input/output component 208, and a Tx/Rx communications component 210. Each of the various operational components 206, 208, 210, and 212 is powered by the variable power supply 202 via power connections 222a, 222b, 222c, and 222d (generically referred to as power connections 222). Additionally, the controller 212 is connected to variable power supply 202 via control connection 224. According to embodiments, the variable power supply 202 can be configured to supply each of components 206, 208, 210, and 212 of the operational component with the same operational voltage or with different operational voltages. Additionally, the variable power supply may comprise a plurality of power supplies, each of which may be variable or not variable.

According to embodiments of the disclosure, the controller 212 is configured to communicate with the variable power supply via control connection 224 and to provide instructions that cause the variable power supply to set one or more output supply voltage levels through connections 222. The memory 206 can comprise any sort of computer readable memory such as a magnetic disk drive, an optical drive, Flash memory, EEPROM, etc. The memory 206 preferably is configured to store program memory for various applications of the electronic device 200. The Tx/Rx component 210 can be configured to connect to and communicate with a wireless or wired communications network through any of a variety of well-known means. The I/O component 208 provides a user interface and can include keyboards, touch pads, touch screens, LED displays, etc.

Figure 3:
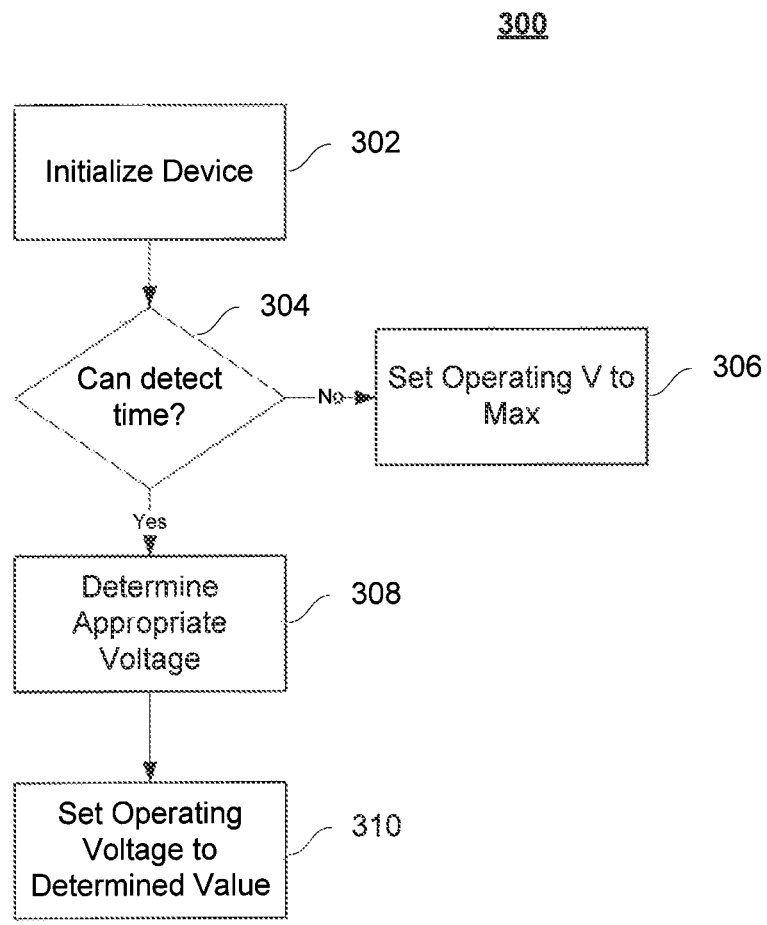
FIG. 3 is a flow chart illustrating a method of compensating for aging semiconductor material according to embodiments of the disclosure.

FIG. 3 illustrates a method 300 of mitigating the effects of aging semiconductor material according to embodiments of the disclosure. According to the method, the electronic device 200 is initialized at step 302. The device can be initialized by setting the operational voltage supplied by the variable power supply 202 to an initial voltage. According to some embodiments, this initial voltage can be the maximum voltage ($V_{MAX}$) required to compensate for semiconductor aging over the course of the operational life of the device.

At step 304, the method determines whether the device can detect the current time. According to some embodiments, this is done by verifying a connection to a network capable of providing the current time. However, according to other embodiments, the device determines that it can detect the correct time by verifying an internal clock functionality. According to some embodiments, the electronic device can use the controller's clock to perform this step, however, it is also envisioned that a second clock external to the controller could be provided for this purpose. If the current time cannot be detected, then the operating voltage is set to a maximum operating voltage $V_{MAX}$ at step 306 and the method is complete. According to some embodiments, $V_{MAX}$ is the same as the maximum voltage required to compensate for semiconductor aging over the course of the operational life of the electronic device. In embodiments where the initial voltage was already set to this value at step 302, no change in operational voltage occurs.

If at step 304, it is determined that the current time can be detected, then the current time is determined and an appropriate operating voltage is determined based on the current time, at step 308. According to embodiments of the present disclosure, the appropriate operating voltage is determined by first determining the amount of elapsed time since an initial start-up time, and referencing a look-up table or some other appropriate data structure to retrieve the appropriate operating voltage from memory 206 according to the elapsed time. According to embodiments of the invention, the initial start-up time (including date) can also be an in-service date or a date of manufacture. Additionally, if start-up time may be stored in a non-volatile storage element such as a Readable Fuse Array, One-time programmable memory, PROM, Flash memory, or a hard drive. Finally, the controller 212 can command the variable power supply 202 to set the appropriate operating voltage at step 310.

As discussed above, the method 300 determines the appropriate operating voltage based on elapsed time since an initial startup. The schedule of appropriate operating voltages based on elapsed time can be based, for instance, on models of how the semiconducting materials in the electronic device age. Table 1 demonstrates an example schedule for varying the operating voltage assuming, for the sake of illustration, that $V_0$ is 1 volt and $V_{MAX}$ is 2 volts.

TABLE 1

| | Time in Service | Required Voltage | Operating Voltage ($V_{OP}$) |
|---|---|---|---|
| $t_0$ | 0 to 1 week | $V_0 + 0\% (V_{MAX} - V_0)$ | 1.0 V |
| $t_1$ | 1 week to 1 year | $V_0 + 33\% (V_{MAX} - V_0)$ | 1.33 V |
| $t_2$ | 1 year to 2 years | $V_0 + 50\% (V_{MAX} - V_0)$ | 1.5 V |
| $t_3$ | 2 years + | $V_0 + 100\% (V_{MAX} - V_0)$ | 2.0 V |

As shown in Table 1, in the initial week of operation, the device may not require any voltage margin to ensure normal operation. $V_0$ is the minimum operating voltage of the device without accounting for the aging of the semiconductor device and $V_{MAX}$ is the maximum voltage required during the projected lifetime of the device. However, the operational voltage can be increased from $V_0$ by a voltage margin (i.e., the difference between $V_{MAX}$ and $V_0$). Accordingly, during the first week, the appropriate operating voltage is 1.0 V. After the first week up to the end of the first year, the appropriate operating voltage to be supplied by the power supply 202 is 1.33 V. After the first year, but before the second year, the appropriate operating voltage is 1.5 V. Finally, after the second year, the appropriate operating voltage power supply is 2 V, which, in this illustrative case, is the maximum voltage that will ever be required in order to compensate for the aging of the semiconducting components of the device over the course of its planned operational life.

Figure 4:
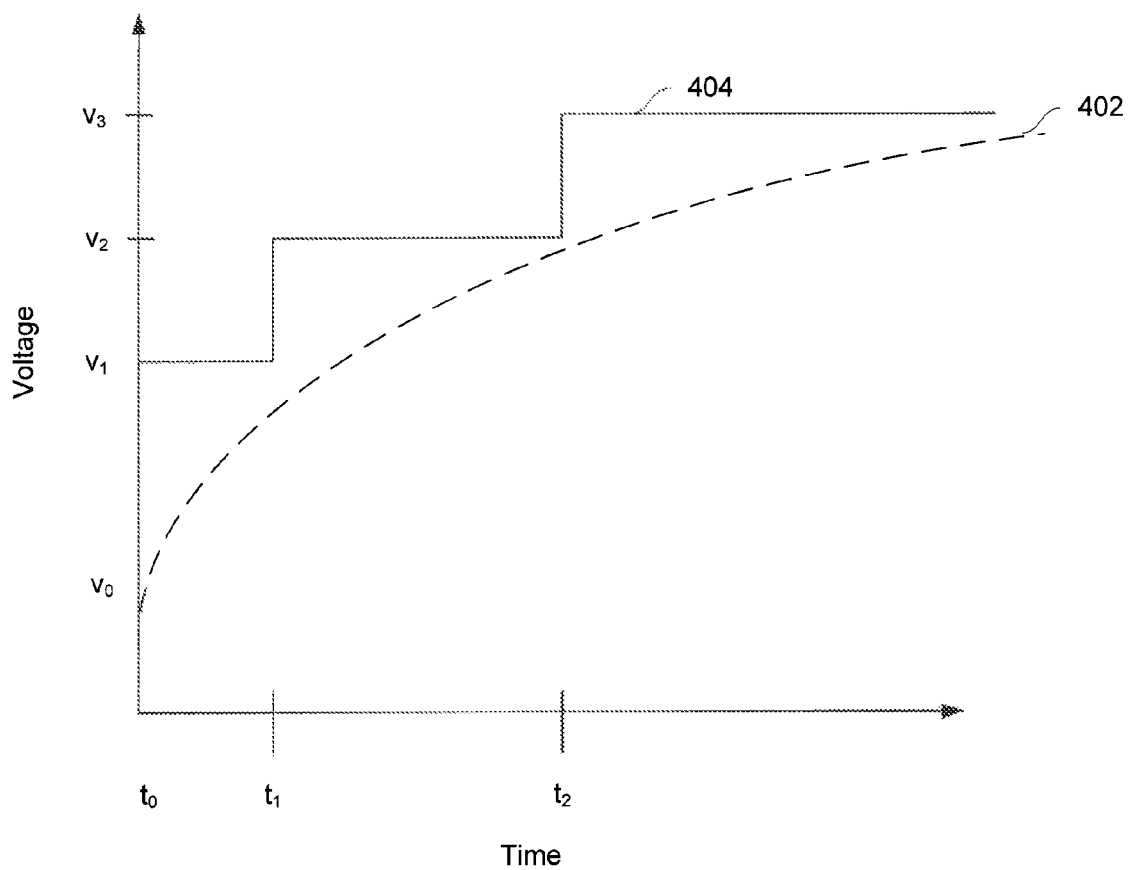
FIG. 4 illustrates the changing operational voltage of an electronic semiconductor device according to embodiments of the disclosure.

FIG. 4 illustrates the way the operational voltage ($V_{OP}$) 404 can be made to vary with time according to embodiments of the disclosure. As shown in FIG. 4 at time $t_0$, the initial operational voltage is set to $V_1$, where $V_1$ is some voltage greater than the minimum required operational voltage $V_0$ that is required by the device without semiconductor aging. As shown in FIG. 4, the required operational voltage (minimum voltage plus the required voltage margin) 402 increases with time. Accordingly, at time $t_1$, the operational voltage ($V_{OP}$) 404 increases to $V_2$. A similar increase in $V_{OP}$ is made at time $t_2$ to $V_3$. In this way, the operational always remains above the required operational voltage 402.

According to some embodiments, various components of the electronic device 200 may require increases in the their individual $V_0$) at different rates in order to compensate for different aging timelines for their semiconductor materials. For instance, assume controller 212 ages more quickly than memory 206. One way to compensate would be to simply increase the operational voltage for the entire operational component 204 at the rate required for the more quickly aging component. However, it would be more efficient to only increase the operational voltage for each component as needed according to its individual aging profile. The method for this kind of compensation is illustrated in FIG. 5.

Figure 5:
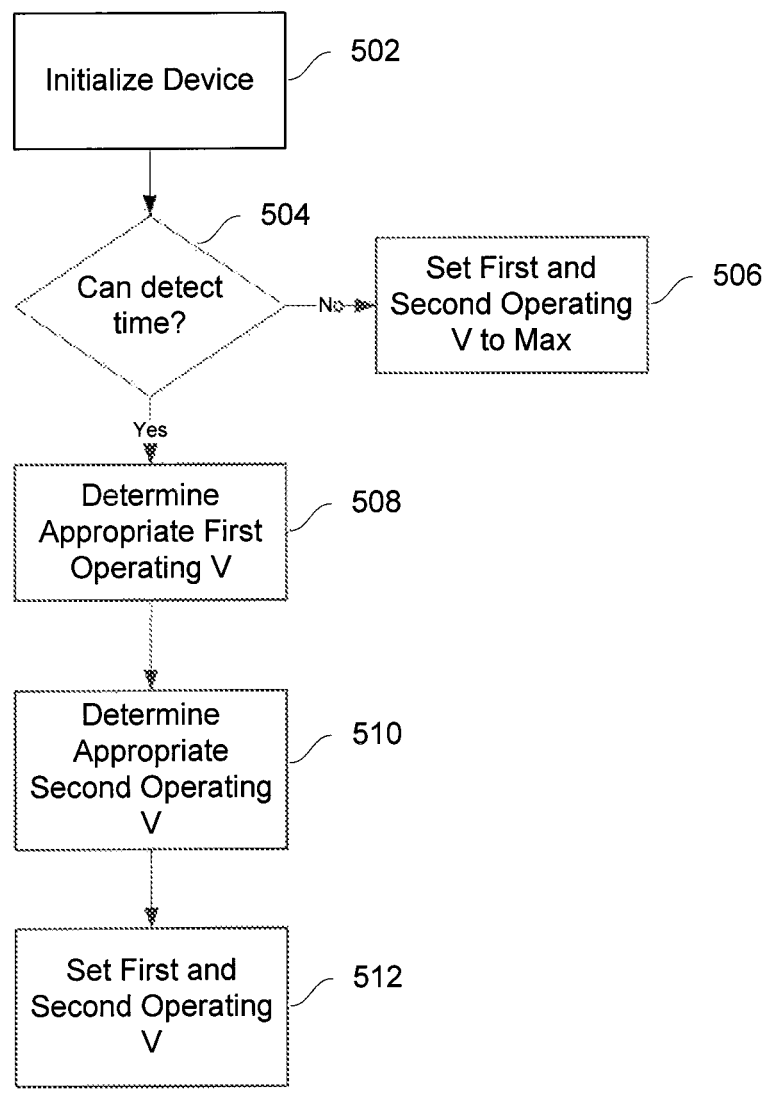
FIG. 5 is a flow chart illustrating a method of compensating for aging semiconductor material according to embodiments of the disclosure.

FIG. 5 illustrates a method 500 of compensating for aging semiconductor material according to embodiments of the disclosure. Method 500 differs from the previously described method 300 in that it provides two different operational voltages to two different portions of the operational component of the electronic device.

According to method 500, the device is first initialized at step 502. According to embodiments, this initialization can set a first operational voltage to a first initial voltage and a second operational voltage to a second initial voltage. The first and second initial voltages can be the same or different. For instance, both could be set to the maximum voltage required to counteract the effects of the aging semiconducting material, or only one set to the maximum voltage and the other set to a lower voltage.

At step 504, it is determined whether the device can detect the current time. According to some embodiments, the device determines that it can detect the current time by verifying access to a network that broadcasts current time information. However, as discussed above, the device 200 can also determine that it can detect the correct time by verifying an internal clock functionality. According to some embodiments, the electronic device can use the controller's clock to perform this step, however, it is also envisioned that a second clock external to the controller could be provided for this purpose. If the device is unable to detect the current time, then it sets both the first and second operating voltages to the maximum voltage required to combat the effects of aging during the operational life of the of the device.

If, at step 504, the current time can be detected, then an appropriate first operating voltage is determined at step 508 based on the elapsed time since an initial time. Similarly, an appropriate second operating voltage is determined at step 510 based on the elapsed time since an initial time. At step 512, the first and second operating voltages are set to the appropriate levels determined at steps 508 and 510, respectively.

Table 2 provides an illustrative example of how the schedule of the two operating voltages might increase with time. Assume, for instance, that most of the components of the electronic device 200 require increased voltage at the first required voltage schedule, but that the controller 212 requires an increased voltage according to the second required voltage schedule. Again, the values of $V_0$ and $V_{MAX}$ are 1 and 2 volts for this example.

TABLE 2

| Time Period | Time in Service | First Required Voltage | Second Required Voltage | First Operational Voltage | Second Operational Voltage |
|---|---|---|---|---|---|
| $t_0$ | 0 to 1 week | $V_0 + 0\%$ $(V_{MAX} - V_0)$ | $V_0 + 50\%$ $(V_{MAX} - V_0)$ | 1.0 V | 1.5 V |
| $t_1$ | 1 week to 1 year | $V_0 + 33\%$ $(V_{MAX} - V_0)$ | $V_0 + 50\%$ $(V_{MAX} - V_0)$ | 1.33 V | 1.5 V |
| $t_2$ | 1 year to 2 years | $V_0 + 33\%$ $(V_{MAX} - V_0)$ | $V_0 + 80\%$ $(V_{MAX} - V_0)$ | 1.33 V | 1.8 V |
| $t_3$ | 2 years + | $V_0 + 50\%$ $(V_{MAX} - V_0)$ | $V_0 + 80\%$ $(V_{MAX} - V_0)$ | 1.5 V | 1.8 V |

As shown in Table 2, during an initial period $t_0$ (e.g., up to the first week of operation), the first operational voltage requires no additional offset and the second required voltage requires an additional voltage margin of 50% (i.e., 50% of $(V_{MAX} - V_0)$). Accordingly, the controller 212 can send a signal to the variable supply 202 to cause it to provide a first operational voltage of 1 V to the memory component 206, I/O component 208, and Tx/Rx component 210. The second operational voltage of 1.5 V can then be supplied to controller 212 at this point. During a second period of time $t_1$ (i.e., after the first week but before the first year has elapsed), the first required voltage must be increased to provide a 33% voltage margin, however the second required voltage does not need to change. Accordingly, the power supply can produce first and second operational voltages of 1.33 V and 1.5 V, respectively. During a third time period $t_2$ (i.e., from one to two years), the first required voltage does not need to change, but the second required voltage needs to be changed to provide an 80% voltage margin. Accordingly, the power supply can produce first and second operational voltages of 1.33 V and 1.8 V, respectively. During the fourth time period $t_3$ (i.e., after 2 years have elapsed), the first required voltage increased by a 50% voltage margin while the second required voltage remains unchanged. Accordingly, the power supply can produce first and second operational voltages of 1.5 V and 1.8 V, respectively.

Figure 6:
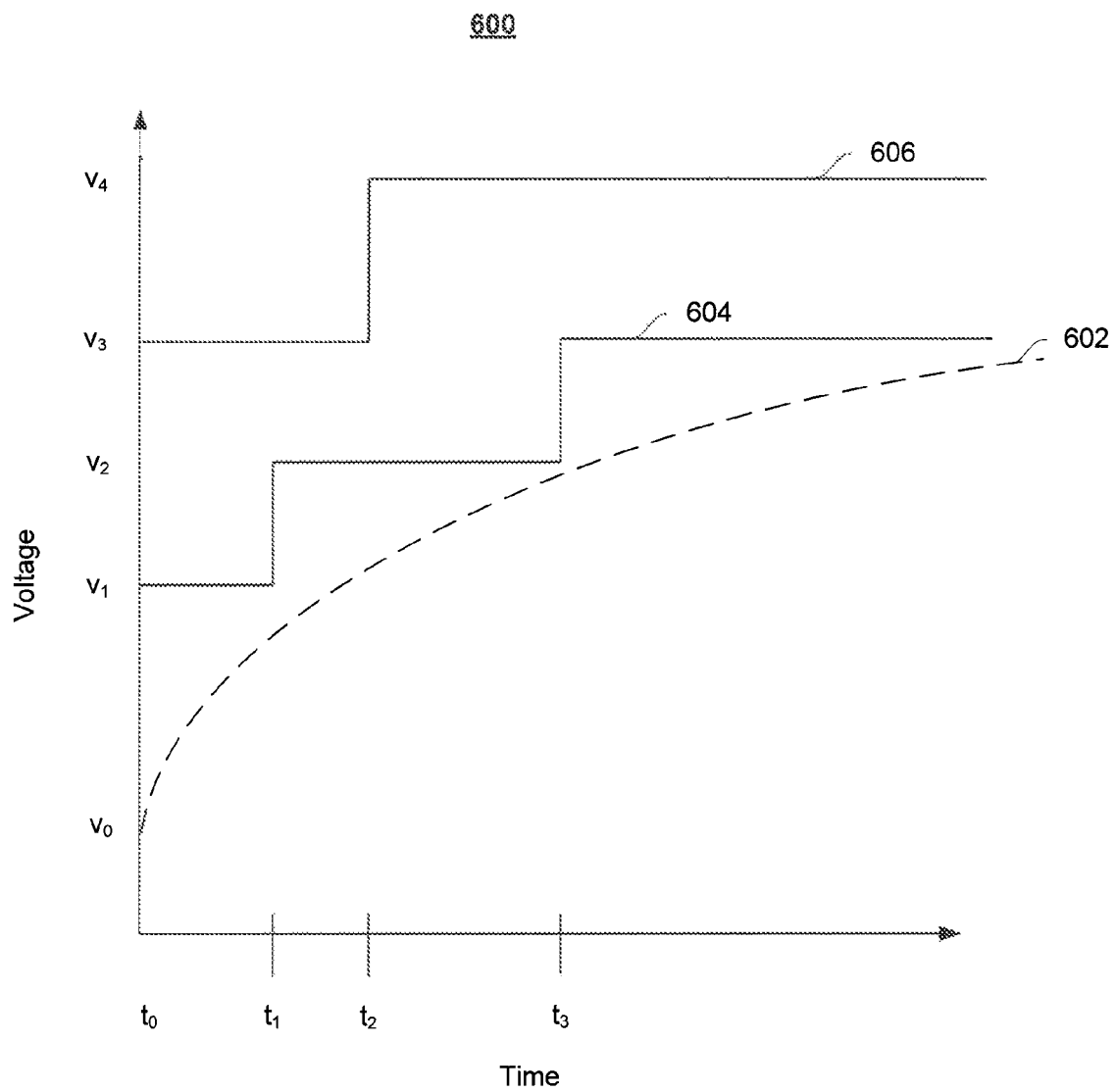
FIG. 6 illustrates changing operational voltage of an electronic semiconductor device according to embodiments of the disclosure.

FIG. 6 illustrates the way that the first operational voltage 604 and the second operational voltage 606 can vary so that they are always greater than the required voltage 602. As shown in FIG. 6, at time $t_0$, first operational voltage is set to $V_1$ and second operational voltage 606 is set to $V_3$. At time $t_1$, in order to remain higher than required voltage 602, first operational voltage 604 is increased to $V_2$. At time $t_2$, second operational voltage 606 is increased to $V_4$. At time $t_3$, the first operational voltage is increased to $V_3$. Thus, as can be seen from FIG. 6, the first and second operational voltages can increase at different rates and provide different voltage margins.

While the disclosure has been described with respect to first and second operational voltages and an operational component having two portions, it is envisioned that the operational component could be divided into any number of portions in order to optimize power consumption. Additionally, according to some embodiments, the power supply may actually comprise several individual power supplies which may or may not be variable themselves.

According to embodiments of the present disclosure, the initial time is a time that has been stored in the memory of device. The initial time is generally indicative of a time when the device entered service. For instance, the initial time could be set during manufacture or during initial testing. Similarly, the initial time could be set during the first time the electronic device is initialized.

Figure 7:
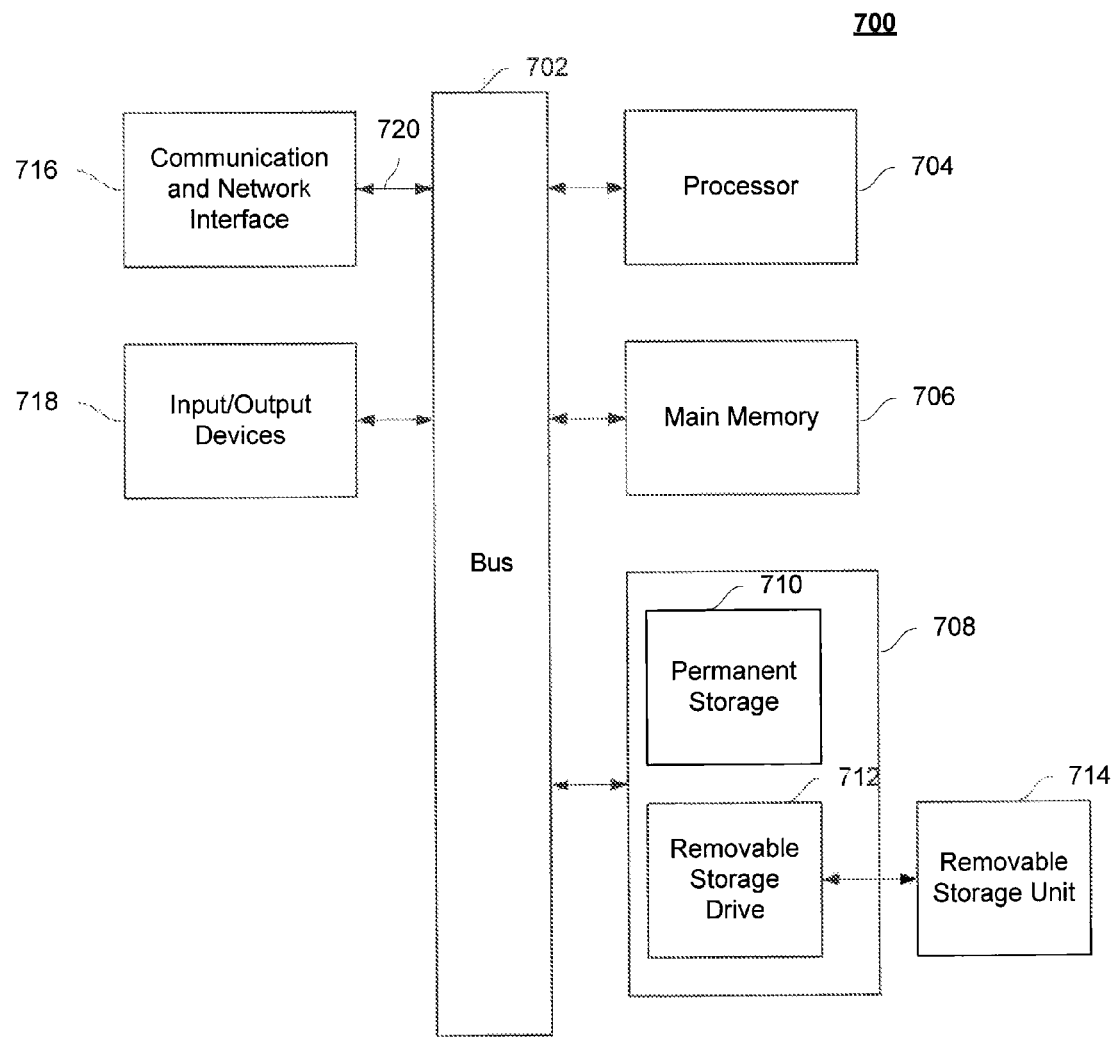
FIG. 7 illustrates a system capable of implementing embodiments of the disclosure.

Various aspects of the disclosure can be implemented by software, firmware, hardware, or a combination thereof. FIG. 7 illustrates an example computer system 700 in which the disclosure, or portions thereof, can be implemented as computer-readable code. For example, the methods illustrated by flowcharts described herein can be implemented in one or more systems 700. Various embodiments of the disclosure are described in terms of this example computer system 700. After reading this description, it will become apparent to a person skilled in the relevant art how to implement the disclosure using other computer systems and/or computer architectures.

Computer system 700 includes one or more processors, such as processor 704. Processor 704 can be a special purpose or a general purpose processor. Processor 704 is connected to a communication infrastructure 702 (for example, a bus or network). According to some embodiments, system 700 may exists as a an ASIC or system-on-chip architecture or as separate components. According to embodiments of the disclosure, the computer system can comprise a general purpose computer, a wireless communications device such as a "smart" phone, a personal digital assistant, a tablet computer, a media playback device, etc.

Computer system 700 also includes a main memory 206, preferably random access memory (RAM), and may also include a secondary memory 708. Secondary memory 708 may include, for example, a permanent storage 710 (e.g., a hard disk or solid state memory), a removable storage drive 712, and/or a memory stick. Removable storage 712 may comprise a floppy disk drive, a magnetic tape drive, an optical disk drive, a flash memory, or the like. The removable storage drive 712 reads from and/or writes to a removable storage unit 714 in a well-known manner. Removable storage unit 714 may comprise a floppy disk, magnetic tape, optical disk, USB Flash memory, EEPROM, etc. which is read by and written to by removable storage drive 712. As will be appreciated by persons skilled in the relevant art(s), removable storage unit 714 includes a computer usable storage medium having stored therein computer software and/or data.

In alternative implementations, secondary memory 708 may include other similar means for allowing computer programs or other instructions to be loaded into computer system 700. Such means may include, for example, a removable storage unit 714 and an interface (not shown). Examples of such means may include a program cartridge and cartridge interface (such as that found in video game devices), a removable memory chip (such as an EPROM, or PROM) and associated socket, and other removable storage units 714 and interfaces which allow software and data to be transferred from the removable storage unit 714 to computer system 700.

Computer system 700 may also include a communications and network interface 716. Communications interface 716 allows software and data to be transferred between computer system 700 and external devices. Communications interface 716 may include a modem, a communications port, a PCM-CIA slot and card, or the like. Software and data transferred via communications interface 716 are in the form of signals which may be electronic, electromagnetic, optical, or other signals capable of being received by communications interface 716. These signals are provided to communications interface 716 via a communications path 720. Communications path 720 carries signals and may be implemented using wire or cable, fiber optics, a phone line, a cellular phone link, an RF link or other communications channels.

The network interface 716 allows the computer system 700 to communicate over communication networks or mediums such as LANs, WANs the Internet, wireless networks, telephone networks, cellular networks, etc. The network interface 716 may interface with remote sites or networks via wired or wireless connections.

In this document, the terms "computer program medium" and "computer usable medium" and "computer readable medium" are used to generally refer to media such as removable storage unit 714, removable storage drive 712, and a hard disk installed in hard permanent storage 710. Computer program medium and computer usable medium can also refer to memories, such as main memory 706 and secondary memory 708, which can be memory semiconductors (e.g. DRAMs, etc.). These computer program products are means for providing software to computer system 700.

Computer programs (also called computer control logic) are stored in main memory 706 and/or secondary memory 708. Computer programs may also be received via communications interface 716. Such computer programs, when executed, enable computer system 700 to implement embodiments of the disclosure as discussed herein. In particular, the computer programs, when executed, enable processor 704 to implement the processes of the disclosure, such as the steps in the methods illustrated by flowcharts discussed above. Accordingly, such computer programs represent controllers of the computer system 700. Where the disclosure is implemented using software, the software may be stored in a computer program product and loaded into computer system 700 using removable storage drive 712, interfaces, hard drive 710 or communications interface 716, for example.

The computer system 700 may also include input/output/display devices 718, such as keyboards, monitors, pointing devices, touch screens, touch pads, etc.

The disclosure is also directed to computer program products comprising software stored on any tangible computer useable medium. Such software, when executed in one or more data processing device(s), causes a data processing device(s) to operate as described herein. Embodiments of the disclosure employ any computer useable or readable medium, known now or in the future. Examples of computer useable mediums include, but are not limited to primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.).

CONCLUSION

It is to be appreciated that the Detailed Description and not the Abstract, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the invention should not be limited by any of the above-described exemplary embodiments, but should be defined only in accordance with the following claims and their equivalents.

What is claimed is:

1. A method of mitigating an effect of aging semiconductor material in an electronic device, comprising:
   initializing a first operating voltage for the electronic device to a predetermined initial voltage level;
   determining an elapsed time since an initial time by determining a difference between the initial time and a current time provided by a time clock;
   determining a first appropriate operating voltage based on the determined elapsed time; and
   setting the first operating voltage to the first appropriate operating voltage.

2. The method according to claim 1, further comprising:
   initializing a second operating voltage to a second predetermined initial voltage level;
   determining a second appropriate operating voltage based on the determined elapsed time; and
   setting the second operating voltage to the second appropriate operating voltage.

3. The method according to claim 2, wherein the first operating voltage is used to power a first portion of the electronic device and wherein the second operating voltage is used to power a second portion of the electronic device.

4. The method according to claim 1, further comprising receiving the current time from a communications network.

5. The method according to claim 1, further comprising determining the current time based on an internal clock.

6. The method according to claim 1, wherein the predetermined initial voltage level is the same as a maximum operating voltage level.

7. An electronic device, comprising:
   a power supply configured to produce a first operating voltage at a plurality of different levels;
   an operational component configured to be powered, at least in part, by the first operating voltage; and
   control circuitry configured to:
      initialize the first operating voltage to a predetermined initial voltage level;
      determine an elapsed time since an initial time by determining a difference between the initial time and a current time provided by a time clock;
      determine a first appropriate operating voltage based on the determined elapsed time; and
      set the first operating voltage to the first appropriate operating voltage by sending a signal to the power supply.

8. The electronic device according to claim 7, wherein the power supply is further configured to produce a second operating voltage at a plurality of different levels.

9. The electronic device according to claim 8, wherein the operational component comprises a first portion and a second portion, wherein the first portion is configured to be powered by the first operating voltage and wherein the second portion is configured to be powered by the second operating voltage.

10. The electronic device according to claim 8, wherein the control circuitry is further configured to:
initialize the second operating voltage to a second predetermined initial voltage level;
determine a second appropriate operating voltage based on the determined elapsed time; and
set the second operating voltage to the second appropriate operating voltage.

11. The electronic device according to claim 7, wherein the control circuitry is configured to the current time from a communications network.

12. The electronic device according to claim 7, wherein the control circuitry is configured to determine the current time based on an internal clock.

13. The electronic device according to claim 7, wherein the predetermined initial voltage level is the same as a maximum operating voltage level.

14. A computer readable medium containing instructions that, when executed by a computer, cause the computer to:
initialize a first operating voltage for an electronic device to a predetermined initial voltage level;
determine an elapsed time since an initial time by determining a difference between the initial time and a current time provided by a time clock;
determine a first appropriate operating voltage based on the determined elapsed time; and
set the first operating voltage to the first appropriate operating voltage;
wherein the first operating voltage is used to power at least a portion of an electronic device.

15. The computer readable medium according to claim 14, further containing instructions that cause the computer to:
initialize a second operating voltage to a second predetermined initial voltage level;
determine a second appropriate operating voltage based on the determined elapsed time; and
set the second operating voltage to the second appropriate operating voltage.

16. The computer readable medium according to claim 15, wherein the first operating voltage is used to power a first portion of the electronic device and wherein the second operating voltage is used to power a second portion of the electronic device.

17. The computer readable medium according to claim 14, wherein the current time is received from a communications network.

18. The computer readable medium according to claim 14, wherein the current time is based on an internal clock.

19. The computer readable medium according to claim 14, wherein the predetermined initial voltage level is the same as a maximum operating voltage level.

20. The method according to claim 1, wherein the first operating voltage for the electronic device is initialized to the predetermined initial voltage level at the initial time.

21. The method of claim 1, wherein the initial time includes an initial date, and the current time includes a current date.

22. The electronic device of claim 7, wherein the initial time includes an initial date, and the current time includes a current date.

23. A method of mitigating an effect of aging semiconductor material in an electronic device, comprising:
initializing a first operating voltage for the electronic device to a predetermined initial voltage level at an initial time, the initial time including an initial date;
determining a current time provided by a time clock, the current time including a current date;
determining a difference between the initial time and the current time to provide an elapsed time, the elapsed time including a number of days between the initial calendar date and the current date;
determining a first appropriate operating voltage based on the elapsed time; and
setting the first operating voltage to the first appropriate operating voltage.

* * * * *

UNITED STATES PATENT AND TRADEMARK OFFICE
CERTIFICATE OF CORRECTION

PATENT NO. : 8,823,447 B2
APPLICATION NO. : 13/331765
DATED : September 2, 2014
INVENTOR(S) : Anatoly Gelman It is certified that error appears in the above-identified patent and that said Letters Patent is hereby corrected as shown below:

In the Claims

In column 12, line 35, replace "initial calendar date" with -- initial date --.

Signed and Sealed this
Second Day of June, 2015

Michelle K. Lee
*Director of the United States Patent and Trademark Office*